(12) United States Patent
Russell et al.

(10) Patent No.: US 6,598,047 B1
(45) Date of Patent: Jul. 22, 2003

(54) METHOD AND SYSTEM FOR SEARCHING TEXT

(76) Inventors: David W. Russell, 920 Incline Way, Bldg. 1, Suite A, Incline Village, NV (US) 89451; John Oborne, 793 McCourry Blvd., Incline Village, NV (US) 89451

( * ) Notice: Subject to any disclaimer, the term of this patent is extended or adjusted under 35 U.S.C. 154(b) by 192 days.

(21) Appl. No.: 09/625,520

(22) Filed: Jul. 26, 2000

Related U.S. Application Data
(60) Provisional application No. 60/145,609, filed on Jul. 26, 1999.

(51) Int. Cl.[7] .............................................. G06F 17/30
(52) U.S. Cl. ........................... 707/5; 707/3; 707/103 R; 706/15
(58) Field of Search ................................ 707/5, 103 R, 707/2, 3; 704/10, 9; 706/16, 15; 705/50

(56) References Cited

U.S. PATENT DOCUMENTS

| | | | |
|---|---|---|---|
| 4,384,329 A | | 5/1983 | Rosenbaum et al. .......... 704/10 |
| 4,839,853 A | * | 6/1989 | Deerwester et al. ............ 707/5 |
| 4,868,750 A | | 9/1989 | Kucera et al. ................. 704/8 |
| 5,237,503 A | | 8/1993 | Bedecarrax et al. .......... 704/10 |
| 5,398,300 A | * | 3/1995 | Levey .......................... 706/16 |
| 5,551,049 A | | 8/1996 | Kaplan et al. ............... 707/532 |
| 5,649,193 A | * | 7/1997 | Sumita et al. .......... 707/103 R |
| 5,649,221 A | | 7/1997 | Crawford et al. ............ 707/532 |
| 5,761,497 A | | 6/1998 | Holt et al. ...................... 707/5 |
| 5,778,362 A | * | 7/1998 | Deerwester .................... 707/5 |
| 5,787,422 A | * | 7/1998 | Tukey et al. ................... 707/5 |
| 5,862,223 A | * | 1/1999 | Walker et al. ................ 705/50 |
| 6,470,383 B1 | * | 10/2002 | Leshem et al. ............. 709/223 |
| 6,493,702 B1 | * | 12/2002 | Adar et al. ..................... 707/3 |
| 6,510,406 B1 | * | 1/2003 | Marchisio ...................... 704/9 |

OTHER PUBLICATIONS

Chen et al., "A modified HME architecture for text–dependent speaker identification", Sep. 1996, IEEE Transactions on Neural Networks v.7, p. 1309–13.*

* cited by examiner

*Primary Examiner*—Kim Vu
*Assistant Examiner*—Gwen Liang
(74) *Attorney, Agent, or Firm*—Ian F. Burns

(57) ABSTRACT

An associative search methodology is presented whereby words, phrases, entire documents or technical jargon are input to the system for the purposes of searching a database for like items. A self-organizing associative data structure utilizing Latent Semantic Analysis (LSA) combined with a Hierarchical Mixture of Experts (HME) neural network learning system tracks relationships between words and word groupings as well as user significance feedback to automatically expand the search so that data elements can be found which cross technological/taxonomic boundaries. This results in an increase in both recall and precision parameters for each individual user's search.

22 Claims, 5 Drawing Sheets

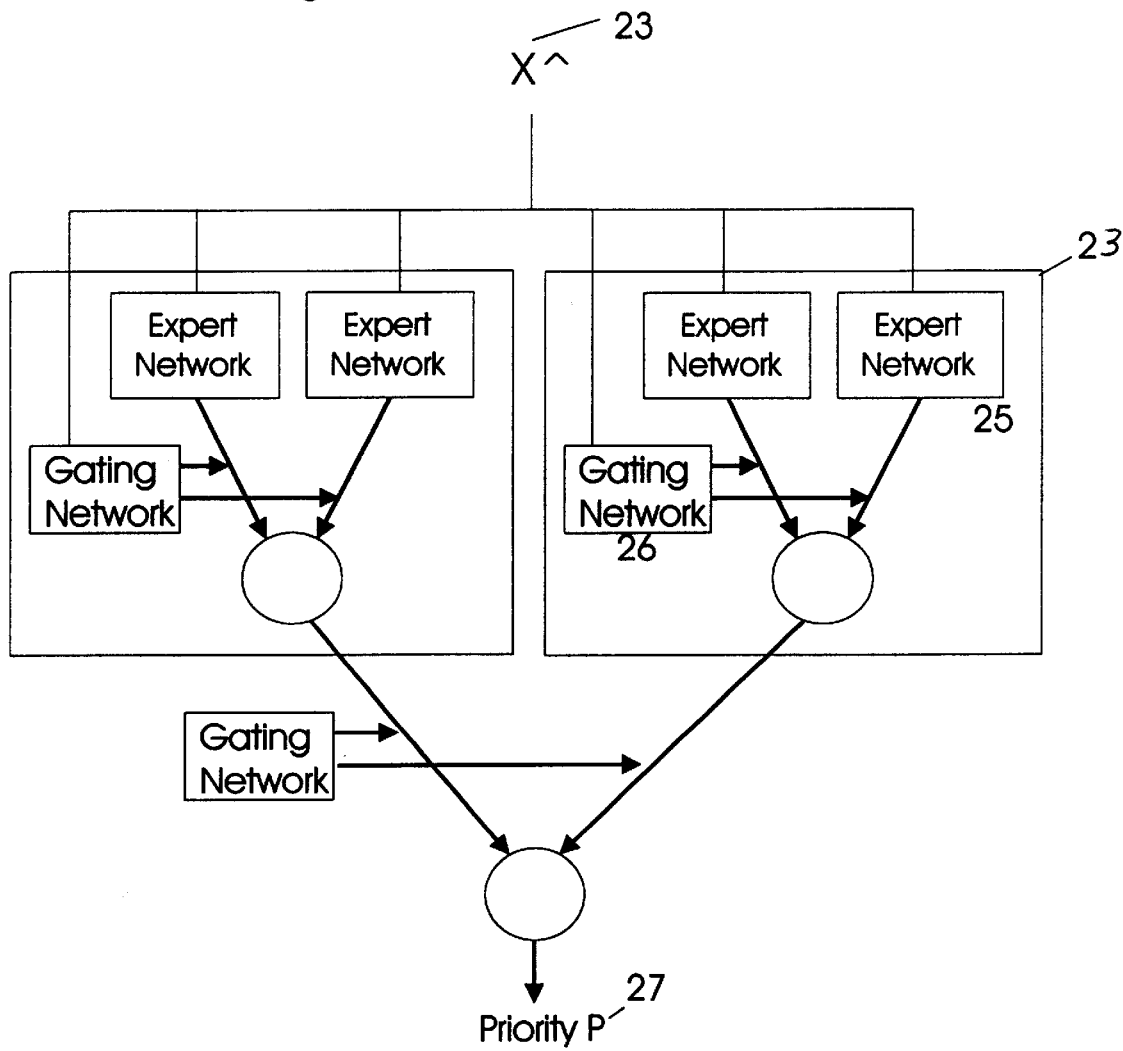

Figure 4

Search     28
Search By Phrase
Search IN: ☐ Technology for Sale    ☐ Tech Wanted Search For: [               ]

Search For Document Like: [BROWSE]

Advanced Search     29
Search By Phrase
Search IN: ☐ Technology for Sale    ☐ Tech Wanted Search For: [               ]

Search For Document Like: [BROWSE]

| [AND ▽] | PUBLISHED FROM [ ] TO [ ] |
| [AND ▽] | Research Discipline [ ] |
| [AND ▽] | Functional Area [ ] |
| [AND ▽] | Field of Practice [ ] |
| [AND ▽] | Classification [ ] |
| [AND ▽] | Region [ ] |

Figure 5

Search Results — 30

Search Results for "FUEL CELL"
Displaying 1-12 of 15 Listings Found

99%  Methods of Making Fuel Cells — 31

98%  Fuel cell having solidified plasma components

97%  Fuel cell cathode

Technology Listing — 32

◁ Previous Listing ▷ Next Listing ☐ Search Results

| Title | Methods of Making anodes for high temperature fuel cells |
|---|---|
| Functional Abstract | Methods of fabricating anodes for high temperature fuel cell in which an alloy powder with a major phase of a base metal is preformed into the shape wanted in the anode. |

View Listing Details — 33

METHOD AND SYSTEM FOR SEARCHING TEXT

CROSS REFERENCES TO RELATED APPLICATIONS

This application claims priority of and incorporates by reference U.S. provisional patent application Ser. No. 60/145,609 filed on Jul. 26, 1999.

BACKGROUND OF THE INVENTION

1. Field of Invention

This invention relates to a method and system for searching text documents.

2. Description of Related Art

Differing communities of researchers use different words and terminology to express similar ideas or describe similar products. This is especially true of technical "jargon." An electronics engineer, for instance, might use the word "plastic" where a chemist would refer to the same compound as a "polymer."

In order to facilitate searches across these technological and taxonomic boundaries, a search system must be able to detect and utilize synonymy and polysemy to expand the original search concept into equivalent areas in other industries. Some researchers have employed simple tree or M×N arrays of classification cross-referencing, but these are either too restrictive or too wasteful of space for an efficient implementation.

Unusual synonymic values must be captured from the search parameters themselves. If the keyword "plastic," for example, is entered it should produce an avalanche of possible matches. To constrain the search, the keyword "clear" is added. This establishes a binding connection between clear and plastic. The search might be further constrained by adding "red." Over time, different searches might reinforce the binding of "clear" and "plastic," but random color searches would tend to degrade the binding of "red." Once the relationships are established, "clear plastic", "optical polymer" and "red lens" could all produce hits to the same database entry.

If the search is further constrained by specifying all hits that did NOT contain a given word, negative binding would be associated with the two keywords adding additional context to the relationship. For example, "Hot peppers" could initially find a synonym with "Heat transfer." Specifying not to include "peppers" in the search would weaken the binding link in future searches where "hot" and "heat" appeared to be synonyms.

Because of the customary use of jargon and keywords as the search parameters, Standard English linguistic expression parsing and classification is not required, resulting in increased search and expansion speed. Also because of jargon, standard thesaurus synonym classifications are insufficient, requiring the system to be self-organizing.

SUMMARY OF INVENTION

1. Advantages of the Invention

One of the advantages of the present invention is that the output of the present is unique to each user.

Another advantage of the present invention is that it ranks search results based on feedback provided by the user.

Yet anther advantage of the present invention is that it requires less processing than other search methods.

These and other advantages of the present invention may be realized by reference to the remaining portions of the specification, claims, and abstract.

2. Brief Description of the Invention

In the preferred embodiment, a keyword or words, phrase, document, or technical jargon or acronym is entered into the search routine. The input data is subjected to Latent Semantic Analysis (LSA) in order to detect the underlying conceptual framework of the input. LSA can work on any input to define a concept, although it is more effective with more data. The result of the LSA is an n-dimensional matrix representing the input parameters within a defined conceptual space.

All documents to be searched have also been subjected to analysis, and have an associated conceptual matrix. A cosine or dot-product of the two matrices results in a conceptual distance calculation. If a document falls within a given distance, it is included as relevant to the search even if it did not contain the exact keywords specified.

The relevant documents are then processed by a Hierarchical Mixture of Experts (HME) neural network configuration in order to improve the relevance of the information to the individual user. Each user on the system has a unique HME organization. Since a given user may have several different subjects that are being researched at any given time, the HME first classifies the result into conceptual groupings to determine the correct expert configuration to use. The HME then gives a relevance grade to each document depending on factors learned from previous use. The entire list, sorted by significance, is then passed to the user.

The user is able to peruse the summaries of all documents, and selects which ones to view. The data presented is layered such that more detailed information is presented at each layer. The HME is given feedback as to which documents are viewed or not viewed, and the level of detail requested by the user. This feedback is used by the HME to learn the differences between the relevant and irrelevant documents—as defined by the user himself—and do a better job of ranking the documents in the next search.

Because the HME is unique to each user, different users will get different significant documents even if they use the same keywords in the search. The LSA, however, is common to all users. The system can also be used in reverse. Given a document, the HME and LSA analysis can be used to find the user who would be most interested in that particular document, even if several had used the same keywords.

The number of nodes and connections in the data structure are enormous, tens to hundreds of thousands. LSA automatically extracts the significant keywords from the entire collection. In addition, more than two keywords can be associated in strong bindings. This prohibits the use of simple M×N matrices for binding, but requires strict limitations on the topological distance between concepts used in the process.

Because of the unique implementation of the HME in conjunction with the LSA matrix, two factors help to minimize the processing required. First, the HME is grown with new conceptual association nodes and experts only as the user begins searches of new concepts. The HME is also pruned over time to remove old search concepts. Of the hundreds or even thousands of significant terms in the LSA matrix, only a few of them are actually relevant to a given conceptual group of documents. The HME expert nodes also prune out consideration of insignificant term pairs in the matrix so that only the significant terms are expressed in the architecture.

The above description sets forth, rather broadly, the more important features of the present invention so that the detailed description of the preferred embodiment that follows may be better understood and contributions of the present invention to the art may be better appreciated. There are, of course, additional features of the invention that will be described below and will form the subject matter of claims. In this respect, before explaining at least one preferred embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

FIG. 3 is substantially an example of a 2-layer HME.

FIG. 4 is substantially a simple and advanced user search input interface.

FIG. 5 is substantially an example of layered record output.

DESCRIPTION OF THE PREFERRED EMBODIMENT

In the first preferred embodiment, the present invention comprises a system wherein a user inputs a search parameter, such as a word or phrase, to search a database of documents. The system first uses Latent Semantic Analysis (LSA) to retrieve relevant documents and then prioritizes the documents based on a Hierarchical Mixture of Experts (HME) neural network system. The system then records which of the documents are viewed by the user and feeds this information back into the neural network to learn which documents are significant to this particular user and which are not.

Figure 1:
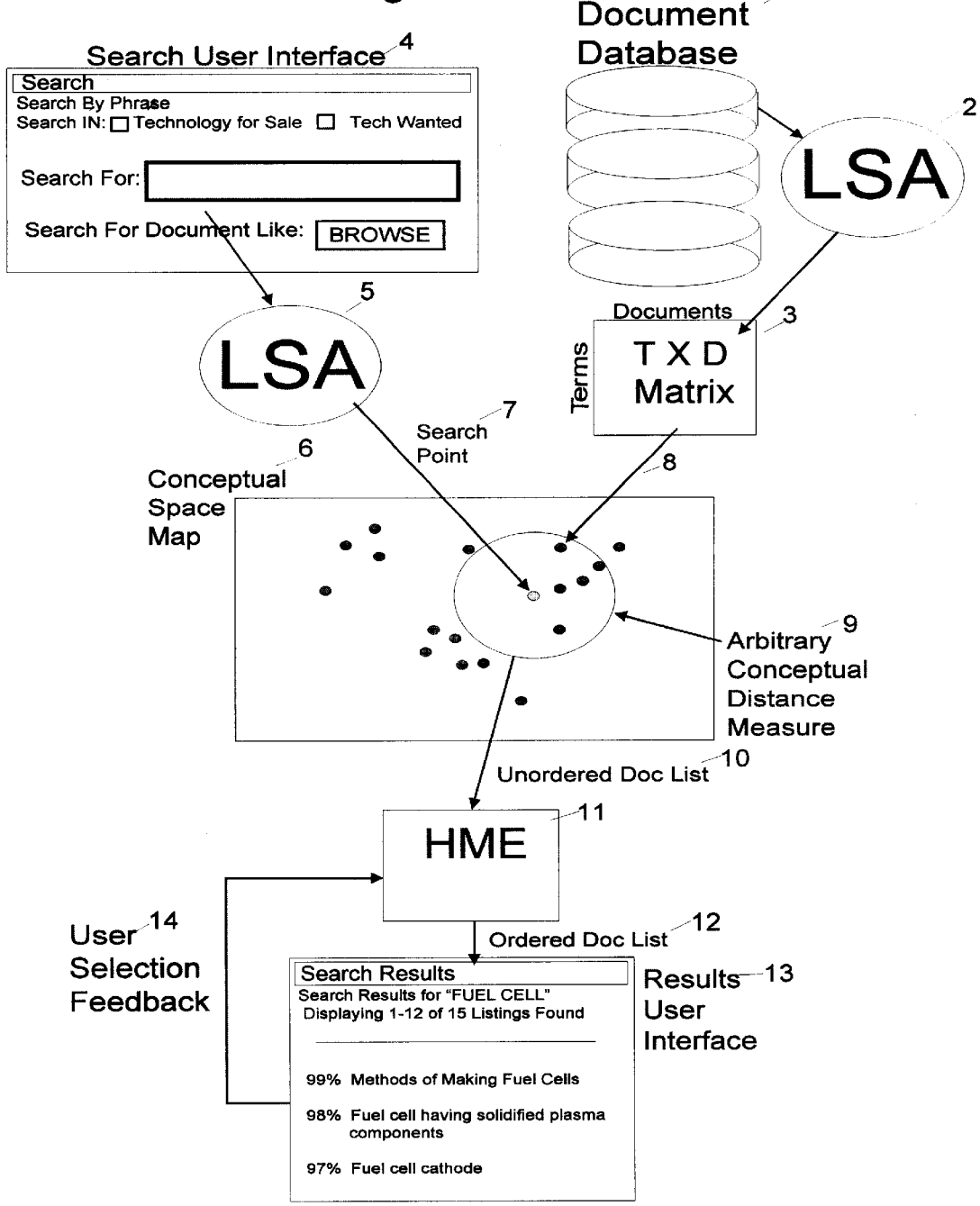
FIG. 1 is substantially a schematic representation of the method and system of the present invention.

In FIG. 1, a database of documents 1 is subjected in batch mode to analysis 2 resulting in an LSA matrix representing the conceptual space of each document 3. To initiate a search for all documents containing a given concept, the user enters the word or phrase into the search interface 4. The search term is also processed 5 and results in a conceptual point 7 in the n-dimensional concept space 6. The conceptual space represents all existing documents 8. The n-dimensional conceptual distance between the search point and all other points is compared to an arbitrary distance metric 9. All of the documents that fall within this space are returned as an unordered list of documents 10.

The unordered list is then fed to the neural network 11 which results in an ordering of the list 12. The ordered list is presented to the user through a layered user interface 13. By selecting documents, feedback 14 is provided to the neural network to further tune the precision of the relevance ordering.

Figure 2:
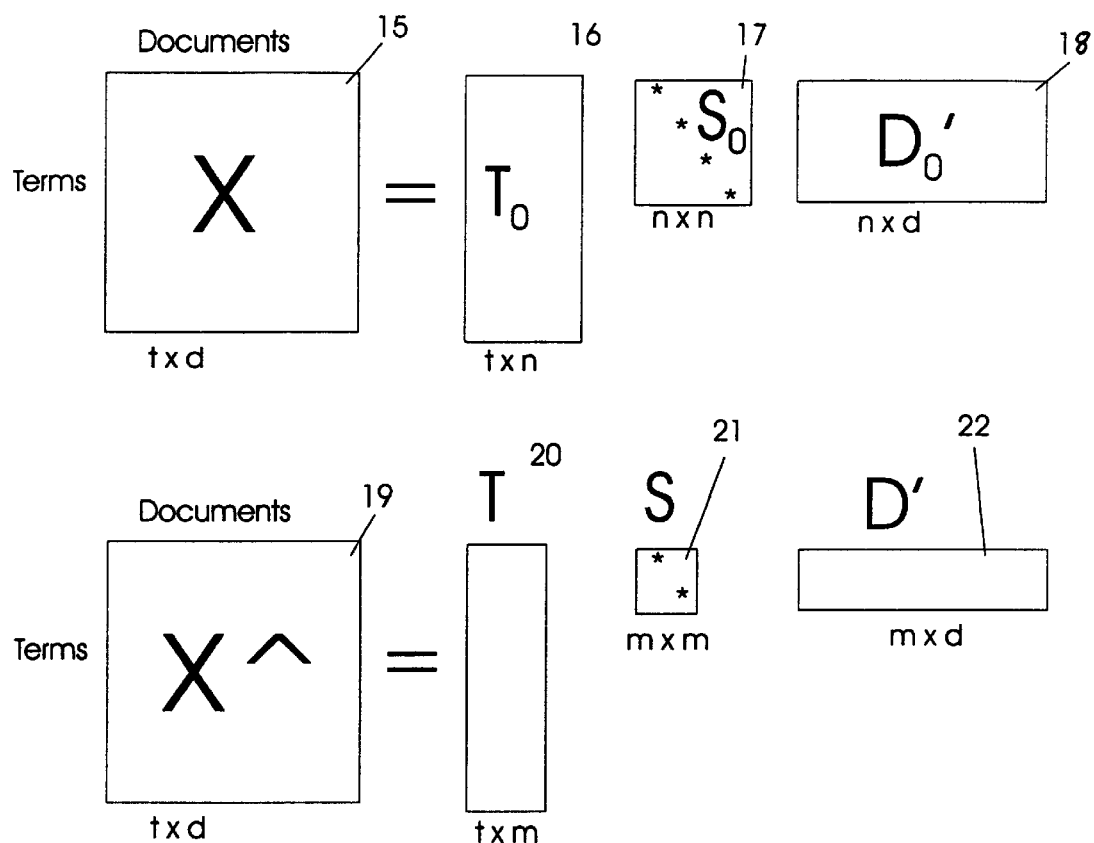
FIG. 2 is substantially a schematic representation of the Singular Value Decomposition matrices used to generate the LSA matrix.

Latent Semantic Analysis is based on human cognition theory and is used to induce global knowledge from local co-occurrence data in a body of text documents. In this implementation, a large matrix of terms derived from the documents versus the documents themselves is first generated (see FIG. 2) 15. The terms are located on one axis, the documents on the other, and the frequency of the term occurrence within each document populates the matrix. In this preferred embodiment, the terms represent technology description documents spanning 18 categories, 33 subcategories, and a total of 293 classes. This results in thousands of significant terms over thousands of documents. In order to identify the significant terms in the data collection, this frequency occurrence matrix is processed via Singular-Value Decomposition (SVD). SVD is a form of Eigenvector-Eigenvalue analysis that performs a linear decomposition of the original matrix into principal components. For any rectangular matrix, in this IA) implementation a matrix t×d where t is terms and d is documents, the matrix X=t×d can be decomposed into three principal matrices 16,17,18:

$$X = T_0 S_0 D_0'$$

In this implementation, the rows represent words, n-grams, or syntagma, and the columns represent the contexts in which the words appear. $S_0$ 17 is the diagonal matrix of singular values and are of decreasing magnitude. An optimal approximation fit of the original matrix can be obtained with a smaller matrix by quantizing the singular value matrix at an arbitrary point. Some point of the $S_0$ matrix is selected and all factors with lower value are reduced to 0. The location of the quantization factor is determined empirically and in effect separates the significant terms from the less significant ones. The corresponding rows and columns from the T 20 and D 22 matrices are also deleted (FIG. 3), resulting in a reduced model which is the least-squares approximation of the original matrix X 19:

$$X' = TSD'$$

This model is used as the basis of comparison between documents and search terms. It is an N-Dimensional model of the conceptual space represented by the terms and documents. The dot-product between two row vectors identifies the similarity of occurrence between two terms across the set of documents. The dot-product between two columns indicates the similarity of terms between two documents. By taking the dot-product between the I-th row of matrix $TS^{1/2}$ and the j-th row of the matrix $DS^{1/2}$, we can evaluate the similarity between a term and a document.

Through these mathematical manipulations, the system can accept a term, multiple terms, or an entire document as input. The input is reduced to the $X^\wedge$ matrix in the same manner as the original document collection, and treated as a pseudo-document. The LSA matrix represents a point in N-dimensional conceptual space. By calculating the semantic distance from this point to all other documents, we can determine which documents fall within an arbitrary maximum distance to identify which documents may be relevant to the original query.

As new documents are added to the system, the LSA must be periodically re-run against the new term sets to determine if significant new terms have been added.

In this embodiment, the features of LSA are combined with a neural network approach referred to as Hierarchical Mixtures of Experts (HME) in order to significantly improve the precision of the returned document collection (FIG. 3). Even with a number of keywords specified, the user is the ultimate judge of whether or not a particular document suits his needs. These unspecified search parameters are often not even recognized until the user has had the chance to narrow the collection to the point where comparisons can be made. In order to decrease the number of irrelevant documents returned, or at least sort them to the bottom of the list for review, the list of proposed relevant documents returned from the LSA is run through the HME.

In FIG. 3, the LSA matrix for each related document is passed into the HME 23. In this example of a two-layer HME, the expert networks 25 are used to determine the relevance of the document. The gating network 26 determines which experts are applicable for this particular concept space and passes the data from that expert onto the summation nodes. The result is the priority 27 of the document.

Upon first use, the HME is untrained and usually will have no effect on the selection of documents. It is also possible to use the aggregate learning of other users who have utilized the same keywords to jump-start or pre-program the initial neural settings for the new user. This allows the new user to obtain immediate benefit from the research done by others. If other researchers have had significantly different insights, the neural net will be randomized and have little effect. If their research patterns have been relatively similar, the neural net will be pre-programmed with their combined strategic focus.

In FIG. 5, after each LSA document is prioritized by the HME, the document collection is presented to the user as a summary page with the title and the first sentence of the abstract displayed 30. This format allows the user to see the most data at one time. The user selects which documents to view in a more detailed manner by selecting the appropriate hyperlink 31. The next level shows the full abstract 32, and an additional link 33 to the third level that shows all of the document. Additional levels or fewer levels could be implemented, but each level has the effect of showing in a graded manner the user's actual interest in the document.

This interest data is returned as training material to the HME. By determining the differences between the documents that are selected for viewing and those which are not, the neural network can be programmed to detect the additional factors—those not explicitly entered by the user in the search parameters—that make up the user's individual preferences and relevance. In subsequent searches in the same conceptual space, the HME can now use this data to prioritize the documents returned by the LSA.

The HME is organized as a structure of conceptual nodes and expert nodes (See FIG. 4). The conceptual nodes are used to select the proper expert node to evaluate the document. The conceptual nodes therefore are used to distinguish between clusters of documents that are representative of a single conceptual space. The expert node is used to evaluate the similarities and differences of each dimension of the N-Dimensional conceptual space and arrive at a ranking for the particular document. In the simplest case where the user is searching only one concept, the one conceptual node has no effect and the data is passed directly to the expert. In cases where the dimensionality of the data is high, several layers of conceptual nodes are assigned with experts at the terminus of the tree such that the conceptual nodes can discriminate between the significant terms to these particular experts and each expert has a lower dimensionality component to process (FIG. 5). This divide-and-conquer technique can be utilized not only to reduce the complexity of each expert in systems with large numbers of terms, but also to distinguish between differing conceptual spaces that might be investigated by a given user.

In most divide-and-conquer approaches, the division of the input space, the divisions tend to increase the bias of the estimator function but unfortunately also increase the variance. In this implementation our primary goal is to increase the number of synonymic or cross-industry connections between technologies. In order to mitigate the variance increase in these data sets which tend to high dimensionality and sparse data, we employ piecewise linear functions to estimate the split and allow "soft" splits, where data can lie simultaneously in several different regions.

In complex cases where the user begins searching a different concept, then additional concept nodes and experts are added to process the new concept, and the conceptual nodes are increased to differentiate between the conceptual spaces of the two concepts. The tree can therefore be grown to arbitrary size to handle any number of concepts. In order to keep the tree from growing continuously, there is a memory component to the tree that is refreshed each use. Long out of use terms are pruned from the tree to reduce its size and complexity.

In most cases, because of the wide dispersion of significant terms within documents over the entire technology space, few of the terms in the $X^{\wedge}$ matrix are actually significant to one particular expert node. The insignificant terms can be deleted from the expert's solution space if they do not show significance within an arbitrary number of searches. This unique feature allows highly complex LSA matrices to be handled by the HME without driving the computational complexity completely out of bounds. Because the HME operates on individual row/column components and not on the matrix itself, it is not only able to remove irrelevant terms from the solution space but as the $X^{\wedge}$ matrix grows the HME can adopt new terms without losing the solutions already learned.

The data at each conceptual node is used to create a gating function (FIG. 3) that determines if the document matrix is passed on to the next node or expert. A deeper tree can be formed at any layer by recursively expanding the expert into another set of sub-experts. The $X^{\wedge}$ LSA matrix is passed into each expert node. These nodes can either be used to detect conceptual groupings (at the leaves of the tree) or to determine the relevance of the $X^{\wedge}$ matrix (non-leaf nodes). The gating networks are used to determine if the match results are passed to the next layer of the hierarchy. The result is a value between 0 and 1.0 that expresses the learned relevance of the matrix.

As the user selects or rejects these documents, the $X^{\wedge}$ matrices are fed back into the HME as directed learning examples. These examples modify the neural weights to better tune the result of the next search.

FIG. 4 shows an example of a simple keyword search 28 and an advanced search 29 that is used to restrict the search to certain meta-tag parameters. The meta-tags can be checked for compliance with the search parameters either at the stage where the documents are being tested for inclusion within the semantic space, after all priority processing, or in between. Early detection would significantly decrease processing requirements, but might also exclude a document that scores very highly in the HME.

Another preferred embodiment of this invention would be to utilize a neural network to replace the Latent Semantic Analysis portion of the algorithm. The LSA functionality can also be implemented as three-layer neural network, allowing all portions of the design to be implemented in neural hardware, for example.

Another preferred embodiment would allow multiple users to collaborate and share their HME network settings to learn from each other's experience, or to archive HME settings under different folders or names so that they could be recalled at a later date.

Other embodiments might include different neural architectures or different text analytic techniques such as polymorphic collocation or text signature files to represent the input documents, but the combination of utilizing the textual analysis to classify the conceptual space and a learning system to adapt the relevance of the document to a particular user would still be in place.

SUMMARY

Although the description above contains many specifications, these should not be construed as limiting the scope of the invention but as merely providing illustrations of some of presently preferred embodiments of this invention. Thus, the scope of the invention should be determined by the appended claims and their legal equivalents rather than by the examples given.

What is claimed is:

1. A method of searching text, the method comprising the following steps, but not necessarily in the order shown:
   (A) storing a plurality of documents in a database;
   (B) performing a latent semantic analysis of the documents;
   (C) generating a latent semantic analysis matrix for the documents;
   (D) performing a latent semantic analysis for a search parameter;
   (E) calculating a conceptual point for the search parameter;
   (F) selecting documents within a predetermined conceptual distance from the conceptual point; and
   (G) prioritizing the selected documents using a hierarchical mixture of experts neural network system; wherein the hierarchical mixture of experts neural network system includes at least one gating network adapted to determine whether data from at least one expert network is used in prioritizing the documents.

2. The method of claim 1 wherein the step of performing a latent semantic analysis for the documents comprises forming a matrix, wherein one axis of the matrix comprises terms in the documents, the other axis of the matrix comprises the documents and the values in the matrix are the frequency of occurrence of the terms.

3. The method of claim 1 wherein feedback from a user is used to prioritize document.

4. The method of claim 1 wherein the hierarchical mixture of experts is initially untrained.

5. The method of claim 1 wherein the hierarchical mixture of experts is trained by user feedback.

6. The method of claim 1 wherein the hierarchical mixture of experts is trained by user feedback, wherein the user feedback is provided by a user making a decision to select a document.

7. The method of claim 6 wherein a user can view selected documents at a plurality of levels of informational detail.

8. The method of claim 7 wherein selecting a document at higher levels of informational detail gives increasing amounts of feedback to the hierarchical mixture of experts.

9. The method of claim 1 wherein the hierarchical mixture of experts is preprogrammed.

10. The method of claim 1 wherein the hierarchical mixture of experts comprises a hierarchical mixture of experts of a first user; and wherein the hierarchical mixture of experts of the first user comprises the hierarchical mixture of experts of a second user.

11. The method of claim 1 wherein the hierarchical mixture of experts comprises a combination of the hierarchical mixture of experts of multiple users.

12. The method of claim 1 wherein the hierarchical mixture of experts comprises at least one from a group consisting of conceptual nodes and expert nodes.

13. The method of claim 12 further comprising adding a new expert node in response to a new concept in a search.

14. The method of claim 12 further comprising adding a new conceptual node in response to a new concept in a search.

15. The method of claim 12 further comprising recursively expanding an expert node into a set of sub-experts nodes.

16. The method of claim 12 further comprising removing unneeded terms from at least one from a group consisting of conceptual nodes and expert nodes.

17. A method of searching text, the method comprising, but not necessarily in the order shown:
   (A) storing a plurality of documents in a database;
   (B) analyzing the documents with a neural network;
   (C) analyzing a search parameter using a neural network;
   (D) calculating a conceptual point for the search parameter;
   (E) selecting documents within a predetermined conceptual distance from the conceptual point; and
   (F) prioritizing the selected documents using a hierarchical mixture of experts neural network system; wherein the hierarchical mixture of experts neural network system includes at least one gating network adapted to determine whether data from at least one expert network is used in prioritizing the documents.

18. The method of claim 17 wherein feedback from a user is used to prioritize documents.

19. The method of claim 17 wherein feedback from a user is used to train the hierarchical mixture of experts.

20. The method of claim 17 wherein the hierarchical mixture of experts is initially untrained.

21. The method of claim 17 wherein the hierarchical mixture of experts is preprogrammed.

22. The method of claim 17 wherein the hierarchical mixture of experts comprises at least one from a group consisting of conceptual nodes and expert nodes.

* * * * *